L. O. KALLESTAD.
CONTROL MECHANISM FOR AUTOMOBILES.
APPLICATION FILED MAR. 29, 1918.
1,315,511.
Patented Sept. 9, 1919.
2 SHEETS—SHEET 1.
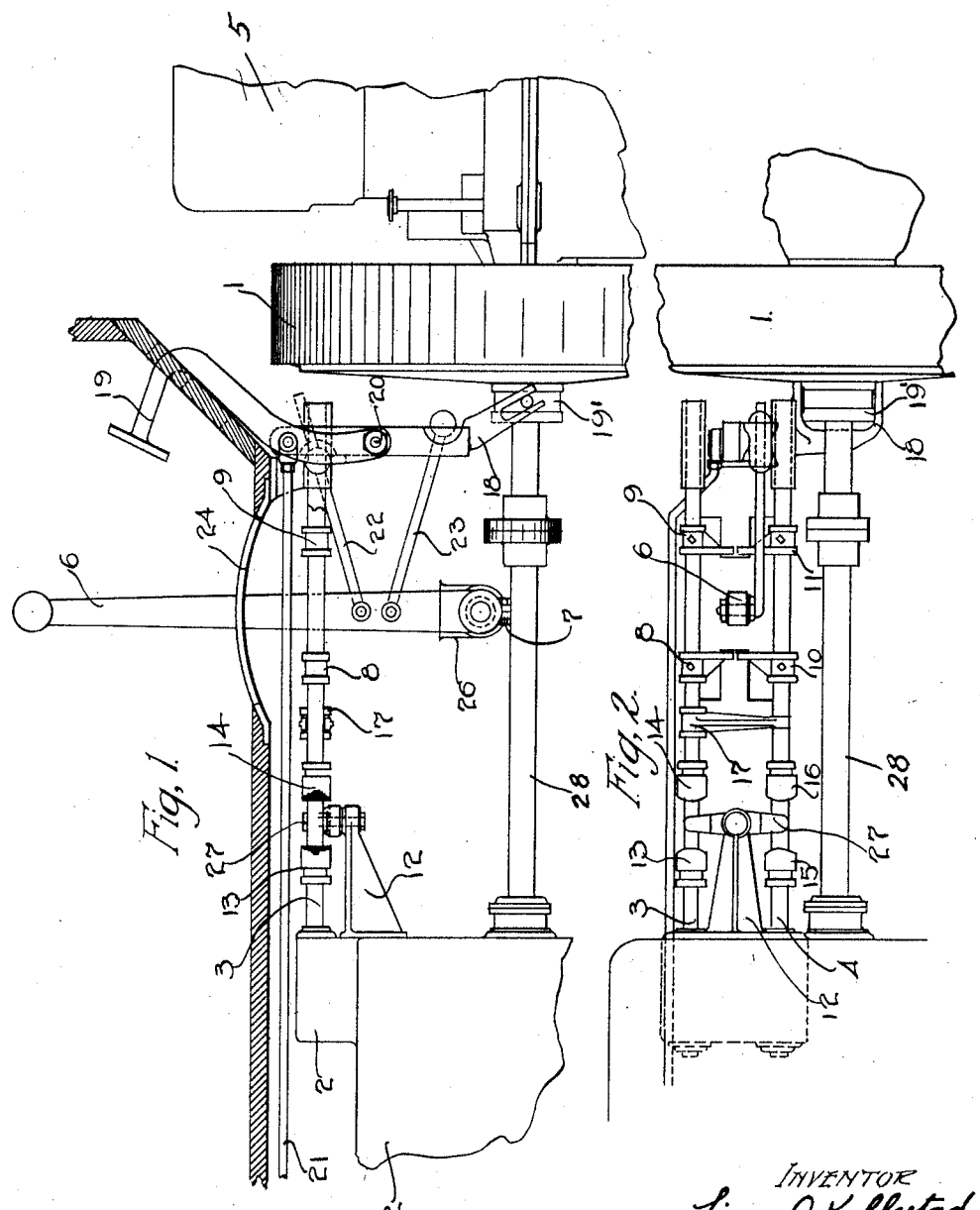
INVENTOR
Linus O. Kallestad
by
Gordon F. Grimes
his Attorney.

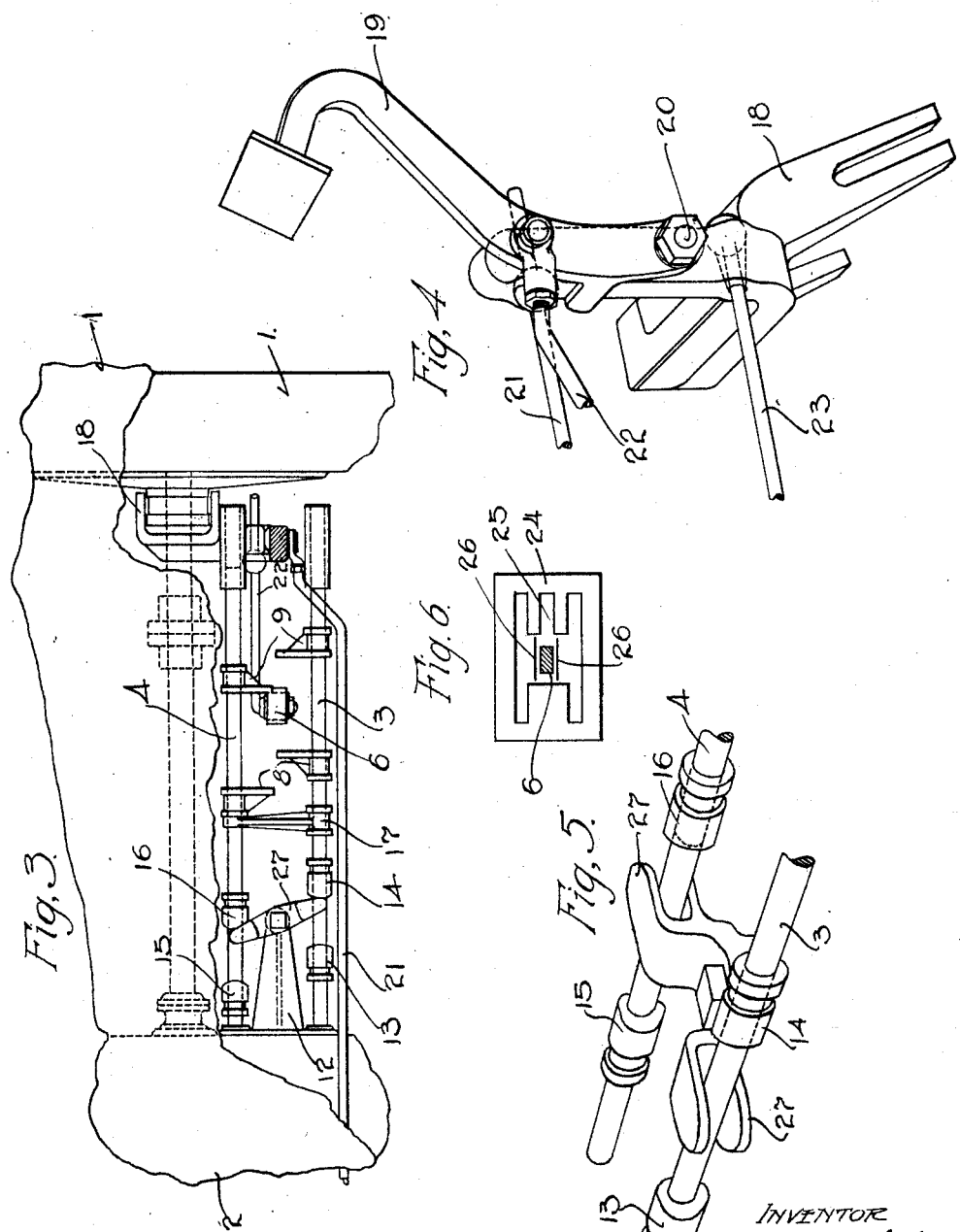

UNITED STATES PATENT OFFICE.

LINUS O. KALLESTAD, OF MINNEAPOLIS, MINNESOTA.

CONTROL MECHANISM FOR AUTOMOBILES.

1,315,511.      Specification of Letters Patent.      Patented Sept. 9, 1919.

Application filed March 29, 1918. Serial No. 225,434.

*To all whom it may concern:*

Be it known that I, LINUS O. KALLESTAD, a citizen of the United States, and a resident of the city of Minneapolis, in the county of Hennepin and State of Minnesota, have invented new and useful Improvements in Control Mechanisms for Automobiles, of which the following is a specification.

My invention relates to the means for controlling an ordinary automobile in the ordinary operation of the same and has for its object to provide a control mechanism wherein the operation of the transmission gears or brakes will simultaneously operate the clutch so that it will be impossible to shift the gears or set the brakes without at the same time releasing the clutch and so that the operation of the automobile will thereby be rendered more easy and simple and the danger of damage and breakage to the automobile and the various parts thereof largely reduced. I accomplish these objects by the mechanism shown in the accompanying drawings in which Figure 1 is a side view, and Fig. 2 a bottom view of the entire mechanism, Fig. 3 is a top view of a portion of the gear shifting rod assembly, Fig. 4 is a side view of the brake and clutch lever assembly, Fig. 5 is a detail of the gear shifting rod assembly and Fig. 6 is a top view of the lever guide. Similar numbers of reference refer to similar parts throughout the views.

Clutch 1 is a cone clutch of the usual construction; transmission 2 is a sliding gear transmission in which the gears are moved and held in the several desired positions by gear shifting rods 3 and 4. Motor 5 furnishes the motive power which is transmitted through clutch 1, shaft 28 and transmission 2 to the drive shaft of the automobile.

Lever 6 is pivotally mounted upon bracket 7 and constructed so that it may impart a forward or rear motion to rods 3 or 4, by contact with collars 8, 9, 10 or 11 each of which is rigidly mounted upon rod 3 or 4. Bracket 12 is a portion of transmission case 2 and equalizing arm 27 is pivotally mounted upon bracket 12 and adapted to be operated by one of collars 13, 14, 15 or 16 and thereby operate against the opposite collar and in conjunction with equalizing arm 17, move it into the position shown in Fig. 1 which is the neutral position of the transmission.

Each of collars 13, 14, 15 and 16 is rigidly mounted upon shaft 3 or 4 and equalizing arm 17, is rigidly mounted upon rod 3 and slidably mounted upon rod 4 so that it will operate against collars 10 or 16. As will be seen from the example shown in Fig. 3, whenever one of the transmission gears is put in mesh arms 27 and 17 simultaneously place in neutral position the gears operated by the shifting rod which is not holding the desired gear in mesh, clutch 1 is operated by clutch lever 18 and collar 19' and is adapted to hold lever 6 in the position shown in Fig. 1 when not being used to shift the transmission gears. Brake lever 19 and clutch lever 18 are pivotally mounted upon bracket 20. Brake lever 19 simultaneously operates brake rod 21, and lever 18.

Gear shifting lever 6 has rods 22 and 23 pivotally mounted upon it. These rods have ball ends which engage lever 18 so that whenever lever 6 is used to shift any of the transmission gears the clutch is simultaneously released.

Lever guide 24 has in addition to the usual positions a central slot 25 which is adapted to be used to put the transmission gears in a neutral position.

Spring 26 is adapted to hold lever 6 in the position shown in Fig. 6, when not being used to shift gears. It will thus be seen from the foregoing description and the objects stated that the invention described simplifies the operation of an automobile by doing away with the necessity of a separate lever for the operation of the clutch member, which is provided in the usual construction, and that invention described eliminates the possibility of breakage or damage by shifting gears while the clutch is set or by applying the brakes and power simultaneously.

I claim:

1. In a mechanism of the kind described two transmission gear shifting rods having collars rigidly mounted thereon, an arm pivotally mounted between the rods adapted to engage the collars on the rods and an arm rigidly mounted upon one of the rods and adapted to engage the collars on the opposite rod, the mechanism being adapted upon the engaging of one set of the transmission gears to disengage the other transmission gears.

2. In a mechanism of the kind described two transmission gear shifting rods having collars rigidly mounted thereon, an arm pivotally mounted between the rods adapted to engage the collars on the rods and an arm rigidly mounted upon one of the rods and adapted to engage the collars on the opposite rod, the mechanism being adapted upon the engaging of one set of the transmission gears to disengage the other transmission gears, and means adapted to release the clutch during the engaging or disengaging of the transmission gears.

3. In a mechanism of the kind described two transmission gear shifting rods having collars rigidly mounted thereon, an arm pivotally mounted between the rods adapted to engage the collar on the rods and an arm rigidly mounted upon one of the rods and adapted to engage the collars on the opposite rod, the mechanism being adapted upon the engaging of one set of the transmission gears to disengage the other transmission gears, and means adapted to release the clutch during the engaging or disengaging of the transmission gears and means adapted to simultaneously release the clutch when the brakes are set.

LINUS O. KALLESTAD.

Copies of this patent may be obtained for five cents each, by addressing the "Commissioner of Patents, Washington, D. C."